United States Patent

Hill

[15] 3,647,978

[45] Mar. 7, 1972

[54] SPEECH RECOGNITION APPARATUS

[72] Inventor: David Roderic Hill, Alberta, Canada

[73] Assignee: International Standard Electric Corporation

[22] Filed: Feb. 18, 1970

[21] Appl. No.: 12,408

[30] Foreign Application Priority Data

Apr. 30, 1969 Canada ..........................21952/69

[52] U.S. Cl. ..........................................................179/1 5A

[51] Int. Cl. ..........................................................G10l 1/02

[58] Field of Search ....................................179/1 5A, 15.55

[56] References Cited

UNITED STATES PATENTS

| | | | |
|---|---|---|---|
| 3,198,884 | 8/1965 | Dersch | 179/1 5A |
| 3,211,832 | 10/1965 | Putzrath | 179/1 5A |
| 3,416,080 | 12/1968 | Wright | 179/1 5A |
| 3,445,594 | 5/1969 | Kusch | 179/1 5A |

*Primary Examiner*—Kathleen H. Claffy
*Assistant Examiner*—Jon Bradford Leaheey
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

Speech recognition apparatus is provided which is responsive to selected acoustic characteristics for decomposing a signal representing an acoustic input into analogue signals on parallel channels. The analogue signals are transformed into binary signals on parallel channels which constitute time ordered event markers. The apparatus includes means for marking the occurrence of sequential events representing sequential properties of the binary signals and means for storing as a nonordered array pattern information representing both content and order information relating to the acoustic input.

18 Claims, 11 Drawing Figures

Inventor
DAVID R. HILL

By [signature]
Attorney

Inventor
DAVID R. HILL
By [signature]
Attorney

Inventor
DAVID R. HILL
By [signature]
Attorney

Inventor
DAVID R. HILL
By [signature]
Attorney

Inventor
DAVID R. HILL
By [signature]
Attorney

Inventor
DAVID R. HILL
By [signature]
Attorney

Patented March 7, 1972 3,647,978

11 Sheets-Sheet 7

Inventor
DAVID R. HILL
By [signature]
Attorney

Inventor
DAVID R. HILL
By [signature]
Attorney

Inventor
DAVID R. HILL
By [signature]
Attorney

Inventor
DAVID R. HILL
By Kenneth L. Lombardi
Attorney

Patented March 7, 1972 3,647,978

11 Sheets-Sheet 11

Inventor
DAVID R. HILL
By [signature]
Attorney

SPEECH RECOGNITION APPARATUS

BACKGROUND OF THE INVENTION

This invention relates to speech recognition apparatus and is particularly applicable to man/machine communication inter faces required in, for example, the computer industry.

The nature of speech is such that it lends itself to treatment in terms of binary features, at least in classical analysis. Difficulties arise because of difficulties in finding acoustic correlates of the classical distinctive features, or in defining any set of acoustic features which are sufficient for recognition. Even defining what is meant by "sufficient" is not solved in any real sense. Generally speaking, such sets of binary features as have been defined are, moreover, far from statistically independent. In order to find out if a set of features is sufficient for recognition, the most practical approach for speech, with its high information content and considerably variability, is to adopt an empirical, statistical approach, and determine error rates. No recognition scheme will ever be perfect, because a real input can never be sufficiently precisely defined. Therefore, one can not show that a recognition scheme will not work simply by producing an example of speech where it fails. A recognition scheme works if it performs up to some acceptable standard based on the statistics of its performance.

In the case of speech recognition certain basic elements are generally accepted as necessary. A preprocessor, which converts the acoustic signal into some form of data; a processor which selects and transforms the data into a form suitable for decision; and a classification process which is given a data pattern from the processor and classifies it, correctly or incorrectly, or rejects it. The aim may be to maximize the number of correct classifications, or minimize the number of incorrect classifications.

Since the most practical way to evaluate features is to test them in a recognition system, it is not unreasonable tȯ select a really good classification procedure (one that is optimum, simple, and well understood being ideal) and find out what its input requirements are. The processing sections are then defined in terms of input (acoustic signal), output (required input for the decision process), and purpose (features, relevant to recognition, requiring to be detected). In view of the supposed "binary opposition" basis of speech perception, and the known optimality of the Maximum Likelihood Strategy (MLS) which can be realized for binary feature spaces, it (the MLS) is a prime candidate for the decision classification process.

The maximum likelihood decision is a guaranteed optimum procedure, but is only solved for rather restricted cases: (i) where the probability distribution is in terms of a binary space of independent features, and (ii) where the probability distribution is Gaussian, with equal covariance matrices.

SUMMARY OF THE INVENTION

According to the invention there is provided a speech recognition apparatus including means responsive to selected acoustic characteristics for decomposing a signal representing an acoustic input into analogue signals on parallel channels, means for transforming the analogue signals into binary signals on parallel channels which constitute time ordered event markers, means for marking the occurrence of sequential events representing sequential properties of the binary signals and means for storing as a nonordered array pattern binary information representing both content and order information relating to the acoustic input.

In one embodiment of the invention the apparatus further includes means for determining the likelihood ratio of occurrence to nonoccurrence of the constituents of the nonordered pattern in comparison with a predetermined pattern and means responsive to said ratio whereby a decision is made for accepting, rejecting or requesting a repeat of the acoustic input.

There are two problems which should be recognized. The features must be statistically independent, and they should be presented as a set of binary observations, rather than the time-varying set of signals produced by acoustic analyzers.

The latter problem appears under many guises, the common ones in speech being the "segmentation" problem or the "-time-normalization" problem. There are actually two varieties of time-dependent information in speech, a fact not commonly given explicit recognition. One type of information concerns the duration of events, and the other type concerns the order of events. It is suggested that it clarifies one's thinking, and allows the core of the problems to be recognized more easily, if these two types of time information are thought of and handled separately. The further suggestion is made that the handling of necessary duration information is essentially part of the acoustic analysis. The output of the acoustic analyzer then consists of a set of data lines which carry data in the form of standard pulses. Each channel can, for example, be derived from a circuit responsive to some particular characteristic of speech which may be called a Primitive Acoustic Characteristic (PAC)) determined from the acoustic analysis, and depending on duration and/or frequency cues. The inclusion of threshold levels identifies what may be called Primitive Acoustic Features (PAF) occurring in the PAC's. Finally, the beginning and ending of a PAF are events to be noted, since they are the significant parts of a PAF. These events may be called Primitive Acoustic Events (PAE).

For a simple analysis scheme, examples might be high-frequency energy present for more than time $T_a$ but less than $T_b$; high-frequency energy present for more than time $T_b$, no-significant feature present for more than time $T_a$ but less than time $T_b$; no-significant feature present for more than time $T_b$. There is some evidence to suggest that this type of duration analysis, coupled with signals derived from four octave frequency bands, is sufficient to recognize the digits (for example Ross, P. W. 1967—Limited Vocabulary Adaptive Speech Recognition System, presented at 23rd Convention of the Audio Engineering Soc. Oct. 16–19, 1967). Two points should be noted. First, the ternary manner of handling the information, resulting from a threshold (below which the event is ignored) and binary division of the noticeable event.

Such a division is intuitively reasonable for similar reasons to those underlying the ternary proposed for handling spectral slope features (i.e., positive slope, negative slope, no significant slope), and amplitude features. The concept can also be applied to transition rates for formants, rates of rise and fall of the mean power envelope and the rate of change of slope. In some cases there is a division of a noticeable event into two magnitude categories, in other cases there is a division into two sign categories. Clearly in the second case it can also prove profitable to consider each sign category as two magnitude categories, if the magnitude has any significance. The second point to notice is that we have been talking about the acoustic analyzer, and that the output consists of binary signal carrying lines, which in this illustration consist of related pairs. The first line would signal when the input signal terminated at $T_x < T_b$ and the second when the input signal terminated at $T_x > T_b$. In another embodiment three output lines are provided, the third line carrying a signal saying that $T_a$ has been exceeded. If a "dead" region were allowed then both lines would be on together when there was doubt as to which has occurred. Thus such methods convey duration and occurrence information about a given feature in an economical and usable way: i.e., it occurred starting now; it was short, ending now; it was long, ending now.

BRIEF DESCRIPTION OF THE DRAWINGS

The above mentioned and other features of the invention and the manner of attaining them will become more apparent and the invention itself will be better understood by reference to the following description of an embodiment of the invention, taken in conjunction with the accompanying drawings, in which.

DESCRIPTION OF THE PREFERRED EMBODIMENTS

Figure 1:
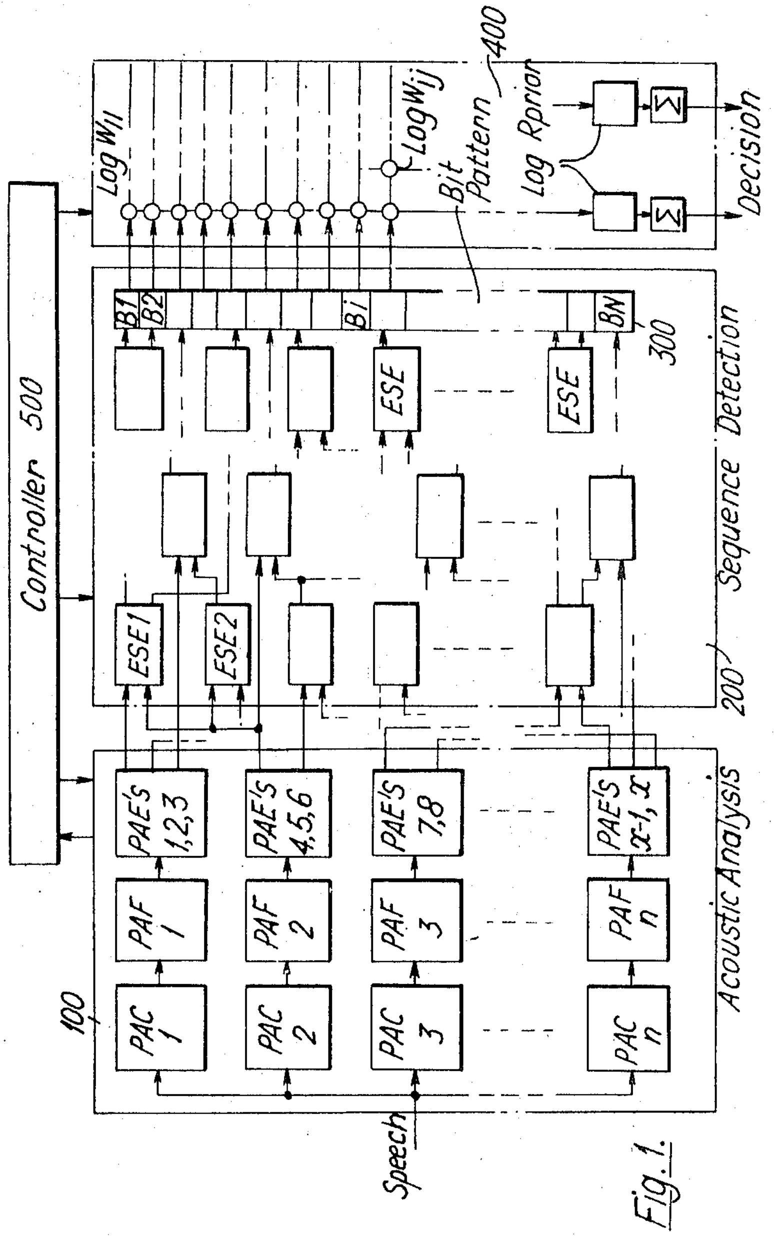
FIG. 1 is a block schematic of the major sections of an automatic speech recognition apparatus.
Figure 2:
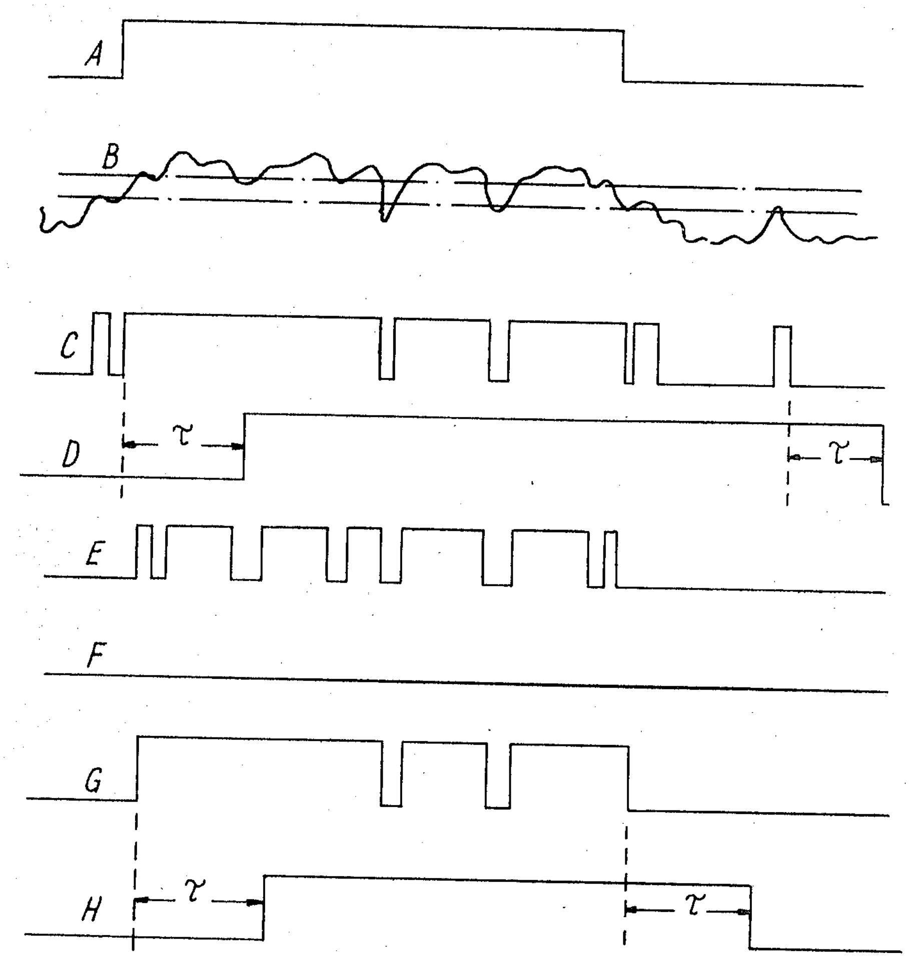
FIG. 2 illustrates the effect of time and level hysteresis in the determination of primitive acoustic features in speech.

In the arrangement shown in FIG. 1 the speech is fed to an acoustic analyzer 100. A set of filters or other detection elements PAC1, PAC...PAC*n* decompose the speech into Primitive Acoustic Characteristics (PAC). Each PAC is reduced to a Primitive Acoustic Feature (PAF) by corresponding threshold devices PAF...PAF*n*. These threshold devices each have a certain degree of hysteresis so that once a decision has been made regarding the PAF this decision is adhered to until there is good reason to change the decision. Such a decision represents the formation of a minimum "null hypothesis" consistent with the incoming evidence and may consist of "the feature is occurring" or "the feature is not occurring." The hypothesis is not abandoned until it is inconsistent with more recent evidence, rather than merely inadequately supported. Without the ability to make and stick to such minimum hypotheses, the machine's ability to structure its input—an essential preliminary to making good decisions is seriously handicapped. In physical terms the effect on signals is as illustrated in FIG. 2A–H. At some level of evidence it is necessary to say a feature is present, and then stick to this decision until the evidence very definitely shows that the feature is absent. Consider an analogue signal containing a PAC the duration of which, in real time, is from $T_1$ to $T_2$ (FIG. 2A), this signal, of course, being unavailable directly. Two trigger levels $tl_1$ and $tl_2$ are indicated (FIG. 2B) in relation to the analogue signal. The output signal when the lower trigger level $tl_1$ is considered without any hysteresis is one indicating the apparent occurrence of several PAF's of varying durations (FIG. 2C). This output is misleading as, due to the nature of speech, there is for all practical purposes only one PAF of duration $T_1$–$T_2$. Incorporating time hysteresis in the circuit has the effect of eliminating some of the insignificant variations in the input signal. The hysteresis introduces a time delay $\tau$ where $\tau$ is the time for which the signal must be continuously in one particular state for that state to occur as an output. It will be noted that a spurious pulse late in time, because of the hysteresis, incorrectly extends the output (FIG. 2D).

If the trigger level is raised to $tl_2$ the effect of the same degree of hysteresis is to eliminate not only the spurious responses (FIG. 2E) but also the correct response, for, if a time hysteresis $\tau$ is introduced, the analogue signal is never of sufficient amplitude for long enough to give a significant output (FIG. 2F). Combining the two trigger levels without time hysteresis, with $tl_1$ being "on" and $tl_2$ being "off" results in a form of amplitude hysteresis which eliminates the lesser of the insignificant fluctuations in the output (FIG. 2G). Introducing a time hysteresis $\tau$ in the combined output eliminates the greater insignificant fluctuations resulting in a proper recognition of the PAF with only a time delay of $\tau$ (FIG. 2H). It will be noted that both amplitude and time are involved in the hysteresis. This is necessary, at the practical level, first in order to make a reasonable representation of the input, and secondly to produce an output signal suitable for subsequent processing.

The outputs of PAF1–PAF*n* consist of signals indicating when certain important features of the speech signal are present and when they are absent. The content is specified by which lines are active, but the order is still implicit in their order of output. The order is difficult to specify because the signals overlap. Before any detection of sequential characteristics is carried out, therefore, it is necessary to carry out a little more processing, namely to change an extended PAF into two events—"primitive acoustic events" (PAE's) which are standard pulses marking the time when a decision is taken that the feature is present, and the time when it is decided that the feature is absent. There is a snag. In doing this we are, rightly, sorting into signals which can be ordered meaningfully, but at the same time we are consigning information about absolute duration of the PAF's to mere implication in terms of the order of events. This may be undesirable simply because the first event after a feature has begun may be that the feature has ended, and if the duration of such a feature is significant, then we have lost it, for at this stage we are interested in processing for order. The trouble arises because a distinction by absolute duration, such as that between a stop release (say for |*t*|) and a fricative (say |*s*|), depends on content and not order. Thus event detection must also take account of absolute duration, and in that way complete the extraction of content. An event detector will therefore have one input, a PAF, and N+1 outputs, one marking the beginning of the PAF, and the others marking its end in each of N duration categories. Evidence suggests that N=2 is usual for English. In any case, if the duration of a PAF is ambiguous—it ends just on the boundary, or within half a standard pulse width—then, to avoid losing information, and perhaps for other reasons as well, the occurrence of both the possible events should be indicated. Thus, in continuous speech, a machine might need to consider a silence of ambiguous duration as either a stop-gap or an end-of-phrase gap. At this stage we have reduced the original input to a set of primitives—PAE's. Resolution of the order is determined by the width of the standard pulse representing each such event. If two events overlap, we cannot assign precedence between the pair concerned. However, we may further process the information to extract significant aspects of the sequence of events in terms of structural descriptors called "compound acoustic events" (CAE's) using a grammar-based method.

The determination of the order information is performed in the sequence detector 200. The connecting lines from the analyzer carry short pulses marking the occurrences of PAE's to Elementary Sequence Elements ESE1, ESE2...$ESE_{2-1}$ $ESE_2$. Each has two primary inputs, for the events whose precedence is to be computed, and a third input into which prohibited events—"sequence breakers"—are "OR-ed" together. One such element corresponds to one level of recursion of the equivalent computer analyzing procedure. The equivalent function in a computer simulation is, of course, carried out by a single recursive subroutine. The grammar is that of a descriptive language for percepts (in this case, words—which are auditory percepts). The language must describe, for example, pertinent aspects of the ordering of the primitives. The necessary pattern description language may be simple, which would compensate for the relative complexity of the primitives required for speech. There is an overwhelming gain in operational flexibility when the specification of subpatterns, their relations, etc., in terms of which the pattern is to be analyzed, is separated from the mechanism which does the analysis, for the specification may easily be changed. Subpatterns, which we may call "compound acoustic events" are defined in terms of subpatterns and/or primitives only, which is the same as saying CAE's are defined in terms of CAE's and/or PAE's only. Let us call both types of event simply "events," where it is not confusing. There is only one relationship fucntion—that of precedence. Thus subpatterns or CAE's may be defined recursively without specifying property functions. The grammar is, however, context sensitive. It is necessary to specify, at each level of the recursions, sublists of other objects which must not bear a prohibited relationship to the object defined at the level involved. In less abstract terms, this amounts to a statement that one can specify that certain other events (which may be called "sequence breakers") must not intervene between the two events whose precedence function is being evaluated. A chief advantage of recursive definition is that the structure of subpatterns, or CAE's, is specified by their name. Thus, considering a computer simulation, the CAE (((A(BC))F)B) would be decomposed by the analyzer program to a head ((A(BC))F) and a tail B. The first sublist of prohibited objects would tell the analyzer which events were not allowed to intervene between the head and tail at this level. The tail is a primitive, and therefore is available as a set of PAE pulses marking the times at which the event B occurred. If the head were also available, then the analyzer could establish the times at which B occurred immediately after the head event, discounting all intervening events except those prohibited. If the head were not available (from previous determination) then it would be treated as a new event to be recognized and the process repeated. Eventually a level of recursion in the simulation would be reached at which only primitives or previously recognized events occupied the tops of the head and tail stacks that had built up, and the procedure could unwind, generating sets of event pulses corresponding to the times of the various events on the head and tail lists, until the time marker pulses for the event originally specified were generated. Such a grammar-controlled analyzer has been simulated on a computer for speech recognition studies. For considering a hardware embodiment the specification of these time markers is analogous to the identification of picture points associated with a pattern or subpattern for a picture. The final ESE outputs are entered as binary information $B_1...B_N$ in a Bit Pattern Register 300. The output of the sequence detector may be in several forms. (Note that the subpatterns are synonymous with events as indicated above.) For example:

1. A bit pattern, each bit corresponding to a particular CAE or PAE, and set to "1" if the event in question was detected.
2. A bit pattern representing a set of "barometer" type counts (count = number of bits set), each count representing the number of times a given event occurred.
3. A varying bit pattern, held in monostables whose period would be adjusted to the length of the longest period for which a given event might be significant.

Figure 3:
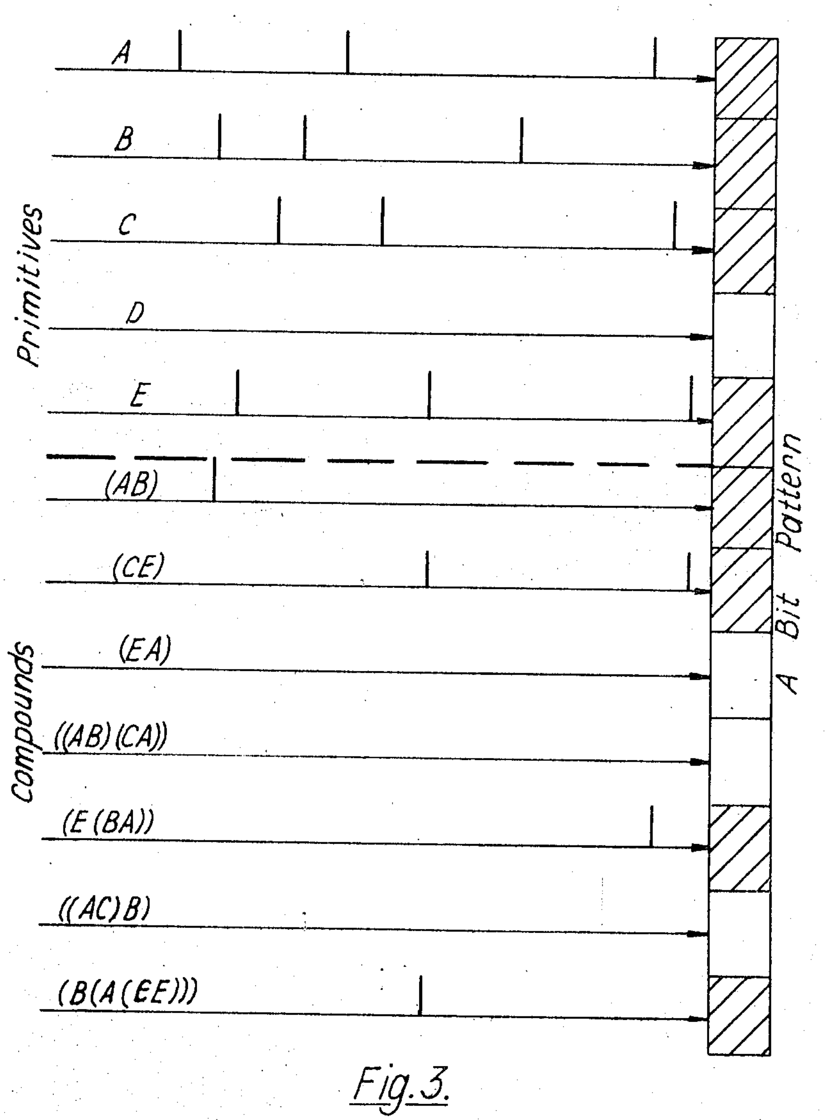
FIG. 3 illustrates a set of primitive acoustic events for a word, the compound acoustic events derived from them and a bit pattern associated with the word.

FIG. 3 illustrates a set of primitive events, the compounds derived assuming no other event is allowed to intervene (thus all events may be said to be "sequence breakers"), and the bit patterns derived according to output method (1).

Thus the original set of time-varying analogue signals may, in the manner suggested, and as illustrated with reference to a computer based grammar, be translated into a set of nonordered, binary features, using output form (1). Decision logic 400 is organized on the simple basis of bit-for-bit matching with patterns stored as plugs in a three layer matrix board. These allow presence, absence, or don't care conditions to be specified, the latter condition obtaining when a plug corresponding to the feature for the word in question is omitted. The whole of the apparatus is run by control circuitry 500.

The various sections of the arrangement of FIG. 1 are now described individually in greater detail.

Figure 4:
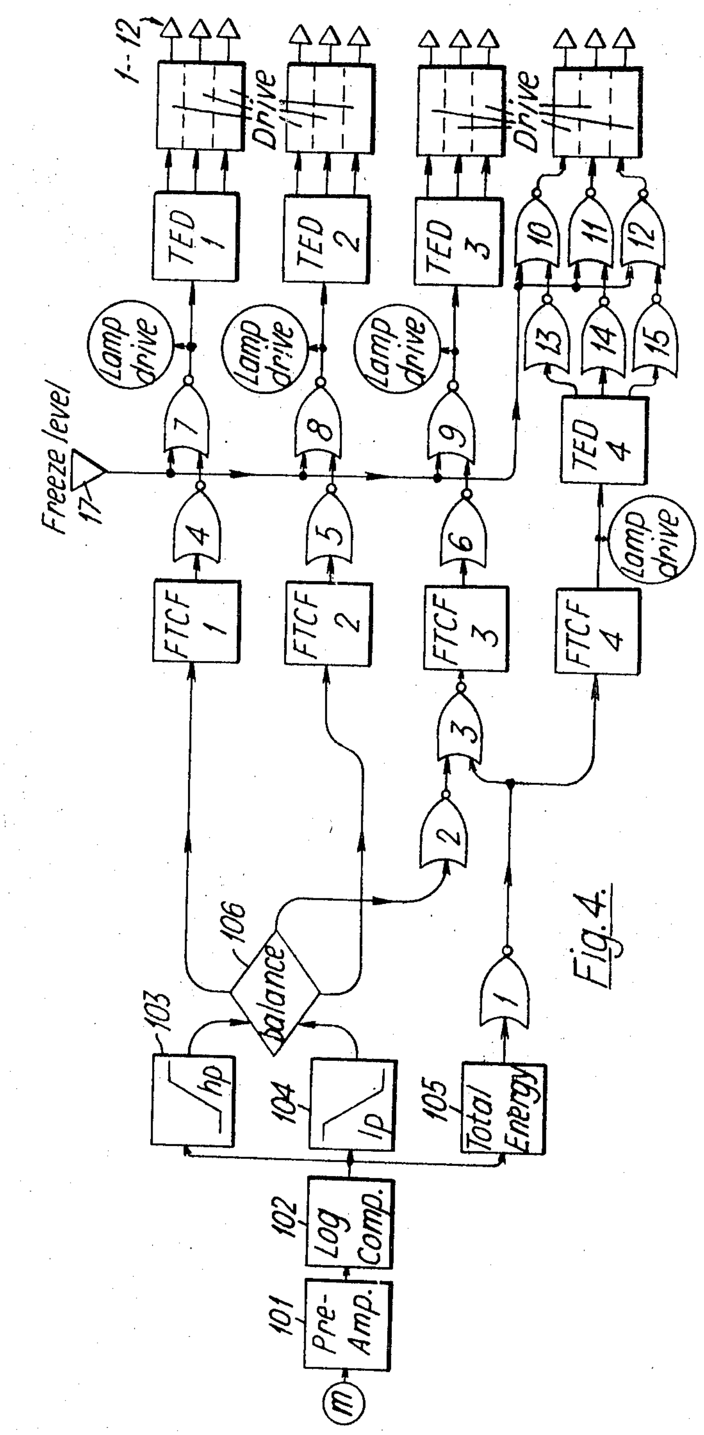
FIG. 4 is a schematic of the significant constituents of one form of acoustic analyzer for FIG. 1.

The speech input from microphone M, FIG. 4, is first passed through a preamplifier stage 101 and a logarithmic compression stage 102 having a syllabic time constant. The compressed speech signal is then fed to three classifying circuits. Two of these are respectively a high-pass filter 103 and a low-pass filter 104. The third section is a total energy detector 105. The high- and low-pass filters each include rectification and smoothing in their outputs. The total energy detector includes rectification and smoothing followed by a trigger circuit which comes on when the rectified and smoothed output of the total energy rises above a set threshold (which may be variable by manual control) and goes off when the same output falls below a second, lower threshold.

The outputs of the filters 103 and 104 are fed to a balance circuit 106 which determines the ratio of high- to low-frequency energy. The balance circuit incorporates a trigger so arranged that the high-frequency output is not inhibited when the ratio of high- to low-frequency energy exceeds a first threshold and is inhibited when this ratio falls below a second, lower threshold. A similar trigger arrangement caters for the opposite condition when the low- to high-frequency energy ratio exceeds a first threshold or falls below a second, lower threshold. If there is a balance between the high- and low-frequency energy content a third output is generated indicating "both." The outputs of the balance circuit 106 and the total energy detector 105 may be deemed the Primitive Acoustic Characteristics of the speech.

The PAC's are fed to feature time-continuity filters FTCF1...FTCF4. The first two are concerned with high- and low-frequency PAC's respectively. FTCF3 is concerned with the "both" output from the balance circuit and FTCF4 with the total energy of the signal. The total energy output is applied to FTCF4 via gate 1 which delivers "1" when there is silence. This "1" is also used to inhibit the output of gate 3 which carries the "both" output to FTCF3. The both output is first applied to gate 2 to deliver a "0" when the balance ratio is 1:1. The NOR-gate 3 will only deliver an output when gate 1 delivers a "0," indicating that speech energy is present, in conjunction with the "0" from gate 2. The PAC inputs to the feature time-continuity filters may be described as "hiss?," "-humph?" "both?" and "gap?" respectively.

Figure 5:
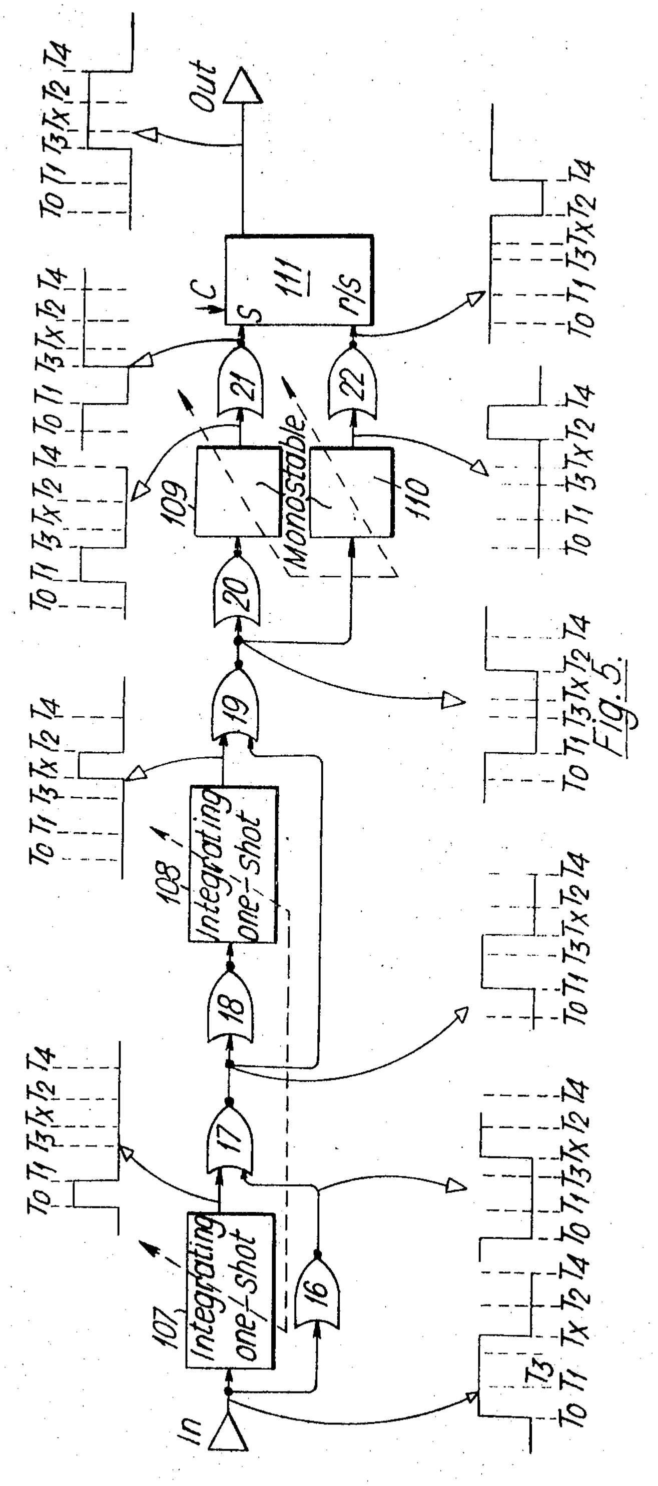
FIG. 5 is a schematic of the significant constituents of a feature time-continuity filter with delay normalization used in the arrangement of FIG. 4.

The purpose of the feature time-continuity filter is to produce a signal only when the input has been present continuously for a preset (manually variable) time, and to stop giving an output when the input has been continuously absent for a preset period of time. The feature time-continuity filter, FIG. 5, comprises a pair of integrating one-shot multivibrators 107, 108 each of which delivers a positive going output pulse which lasts for a time after the last positive going edge input. The input, e.g., a positive pulse $T_o$–$T_x$, is applied to the integrating one-shot multivibrator 107. The positive going leading edge at time $T_o$ triggers the integrating one-shot 107 which delivers a positive pulse $T_o$–$T_1$. The input is also inverted in gate 16 and applied, together with the output from 107, to the NOR-gate 17. The output from 107 will inhibit the output of gate 17 until time $T_1$, so gate 17 delivers a positive going pulse $T_1$–$T_x$. This is inverted in gate 18 and forms the input to the second one-shot multivibrator 108, which is therefore triggered by the positive going back edge at time $T_x$ to produce a positive output pulse $T_x$–$T_2$. This output is applied to the NOR-gate 19 together with the output from gate 17 to produce a negative going pulse $T_1$–$T_2$. This pulse $T_1$–$T_2$ is inverted by gate 20 whose output effectively constitutes a Primitive Acoustic Feature but its generation inevitably involves a delay with respect to the input. Each FTCF therefore also includes a delay normalization arrangement, adjusted to make the overall delay equal to a convenient standard so that all the PAF's are presented simultaneously. The basic PAF output from gate 20 is applied to monostable 109, and the inverted signal from the preceding gate is applied to monostable 110. Monostable 109, being triggered by the positive going leading edge of the PAF input produces a pulse $T_1$–$T_3$ while 110, being triggered by the positive going back edge of the inverted PAF, produces a pulse $T_2$–$T_4$. The outputs from these monostables are inverted by gates 21, 22 and are applied to a flip-flop 111 which is effectively set at time $T_3$ and reset at time $T_4$.

The output $T_3$–$T_4$ from the flip-flop 111 is thus a PAF incorporating "time hysteresis" and normalized delay.

The four PAF outputs, FIG. 4, are applied to ternary event detectors TED1...TED4 to turn the PAF's into PAE's.

Figure 6:
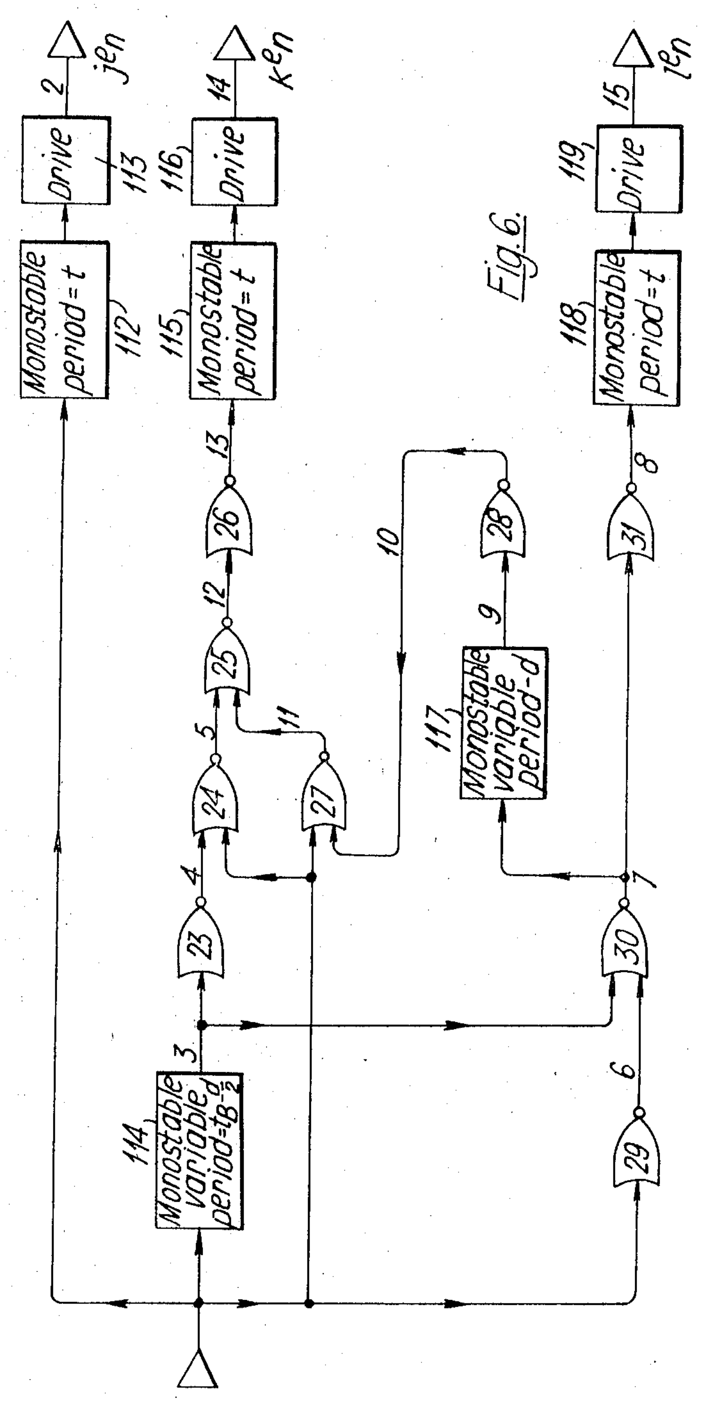
FIG. 6 is a schematic of the significant constituents of a ternary event detector used in the arrangement of FIG. 4.
Figure 7:
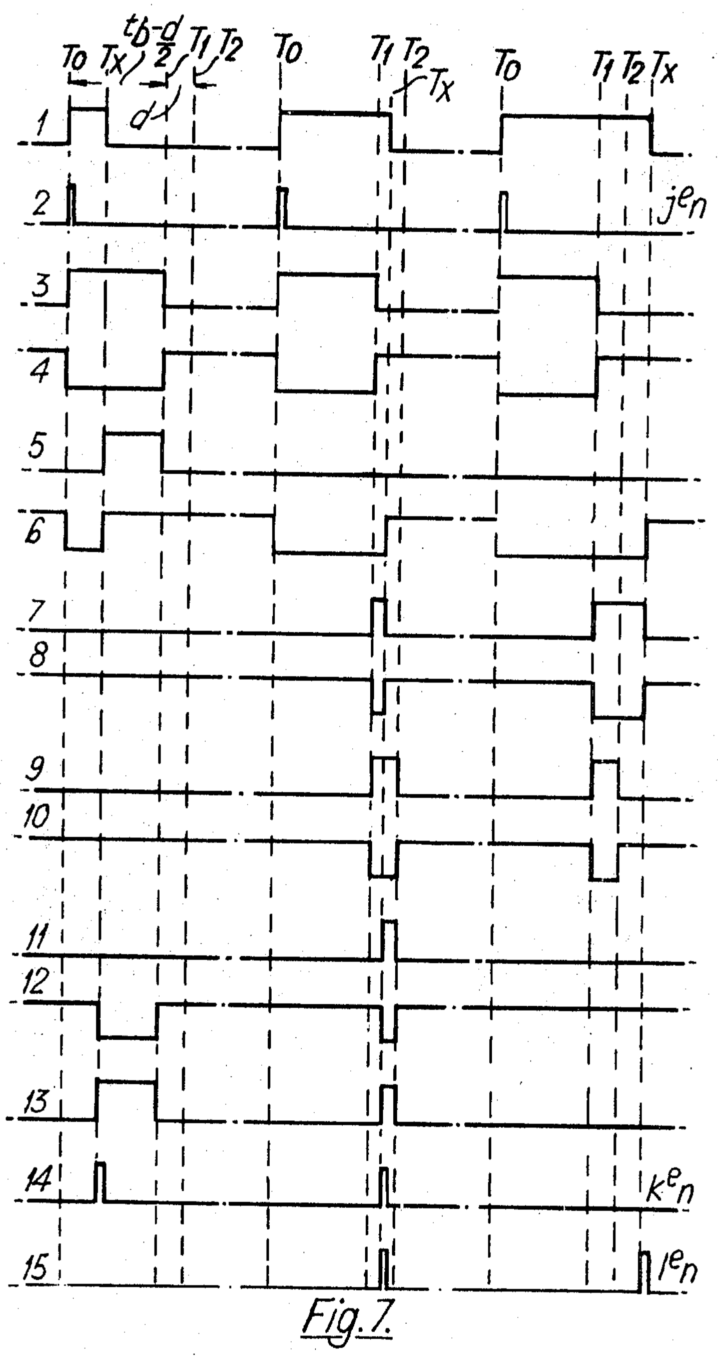
FIG. 7 illustrates the operation of a ternary event detector for the three possible cases of input-pulse duration.

The operation is clear from FIG. 6 and the associated waveform diagram, FIG. 7. A standard pulse, of duration $t$ microseconds, is produced by monostable 112 followed by a drive circuit 113, for an input pulse of any length. If the input pulse ends before a variable monostable 114 period ($t_b$–ti d/2) stops firing then gate 30 never has two simultaneous "0" inputs, and therefore, gives no output. The output of gate 23 will be at "0" when the input ends, giving gate 24 two simultaneous "0" inputs, until the monostable 114 ceases firing. A "1" pulse is therefore produced at the output of gate 24 and, the output of gate 27 being normally "0," the consequent "0" pulse from gate 25 and "1" pulse from gate 26 lead to the output of a standard pulse, width $t$, from monostable 115 and drive circuit 116.

If the input ends during the period of ambiguity (determined by the setting both of the first and of the second variable monostables 114, 117) it will have continued past the end of the firing period of the first variable monostable 114. Gate 30 will, therefore, have received two simultaneous "0" inputs, giving rise to a "1" pulse at its output, starting at the end of the period of the first variable monostable 114, and finishing at the end of the input signal. This "1" pulse is inverted by gate 31, and the trailing edge thus triggers the fixed monostable 118 leading to the production of a standard pulse marking the end of the input at the output of drive circuit 119. At the same time the leading edge of the pulse from gate 30 triggers the second variable monostable 117, period $d$, and for this period of time a "0" is present at the output of gate 28. Thus if the input stops before the expiration of $d$ (i.e., the input stops during the period designated as ambiguous), gate 27 will have two simultaneous "0" inputs, and a "1" pulse will appear on the output, starting at the end of the input, and ending at the expiration of $d$. This "1" pulse, acting on gate 25, produces a "0" pulse at the input to gate 26 and hence a standard pulse from the output of monostable 115 marking the end of the input (since the output for gate 24 has remained "0"). Thus, an input pulse which is ambiguously close in duration to the nominal duration $t_b$ will produce a standard pulse both from monostable 115 and monostable 118, as required.

Finally, if the input ends after the second monostable 117 has ceased firing, then only the standard pulse from monostable 118 will be produced.

It is seen, therefore, that monostable 112 produces pulses each time the input PAF starts, monostable 115 produces a pulse if the input PAF lasts less than $t_b$; monostable 118 produces a pulse if the input PAF lasts longer than $t_b$; and pulses appear simultaneously from monostables 115 and 118 if the input PAF duration is ambiguously close to $t_b$. In this manner PAF's are transformed into PAE's.

To return to FIG. 4. A freeze level is brought into gates 7, 8, 9, 11, 13, 15 to inhibit the production of PAE's when the machine is frozen (and hence in the output cycle). For the "-gap" channel, we cannot inhibit at the PAF level, because silence will be present at the time of freezing, and a spurious "end of long gap" and subsequently "beginning of gap" will be produced. Therefore freezing at this level is effected at the PAE, with the three TED4 outputs being inverted in gates 13, 14, 15 and then applied to gates 10, 11, 12 together with the freeze level.

Figure 8:
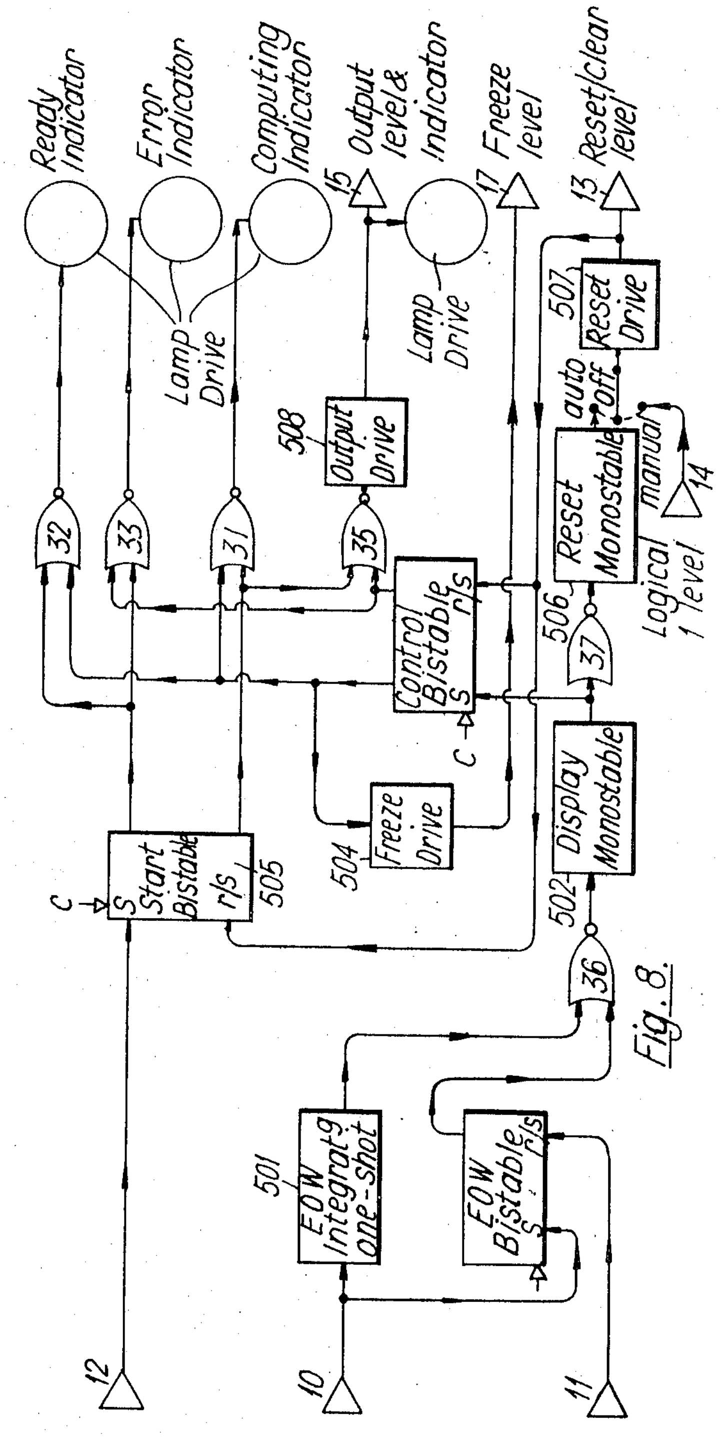
FIG. 8 is a schematic of one form of control circuit for FIG. 1.

It is convenient to consider the controller next. Whenever a "beginning of gap" signal occurs, i.e., from gate 10, FIG. 4, the end-of-word integrating one-shot 501, FIG. 8 starts timing.

If no PAE from gate 11 occurs between the last PAE from gate 10 and the expiration of the period of the integrating one-shot, then gate 36 receives two simultaneous "0" inputs and the output goes to "1," starting at the instant that the monostable period expires. This triggers the display monostable 502, and the leading edge of the output sets the control bistable 503, which, in turn, sets the freeze level via the freeze drive 504 to "1," freezing the machine.

Note that the PAE from gate 12 line is taken to the start bistable 505. The first PAE produced for any word, if the beginning of the word is not missed, must be a PAE from gate 12 "end of long gap." If this is not so, either too much noise preceded the word, or the speaker started speaking before the machine "unfroze" from the last operation. Thus, if the start bistable is still in the reset condition when the machine freezes, some sort of error has occurred. The start bistable levels are therefore used to inhibit the computing indicator drive, and the output level drive, when in the reset condition, and to allow the ready or error indicators to be driven depending on the state of the control bistable 503: when in the set condition it inhibits the error and ready indicator drives, and—depending on the state of the control bistable—allows the freeze or output levels to be driven.

Continuing now from the last paragraph but one. When the machine is frozen, depending on whether or not a valid start was obtained, either the output level will also appear, or an error indication will be made, and output suppressed. The machine stays frozen in the output cycle until the display monostable period expires. Gate 37 inverts the output of the display monostable so that the trailing edge fires the reset monostable 506. If the switch following 506 is set to "auto" the output of the reset monostable produces a reset level via the reset drive 507 which clears the control and start bistables 503, 505. It is also taken to other parts of the machine to clear the memory and output stores of the sequence detector. Thus the reset level puts the machine in the ready state, cleared for action, and "unfrozen."

The switch is provided to inhibit resetting, and to allow manual resetting, if desired. The outputs of 503 and 505 are gated in gates 32, 33, 34 and 35 to obtain the required "ready," "error," "computing" and "output" indicator signals. The output signal is derived via an output drive circuit 508.

Figure 10:
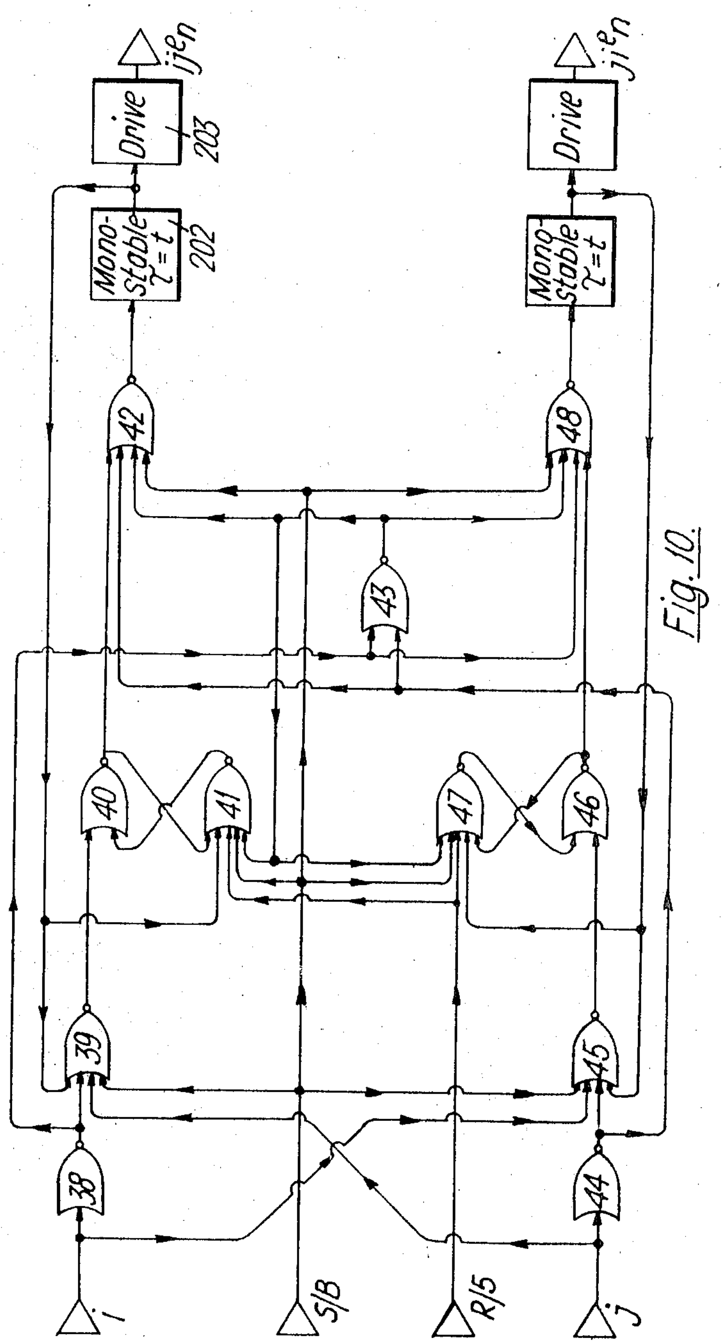
FIG. 10 is a schematic of the significant constituents of an elementary sequence event generator suitable for use in the arrangement of FIG. 4.

The sequence detector 200, uses ESE's (Elementary Sequence Elements) to carry out first order Sequence Detection on the basis of selected PAE's. Each of the ESE's $\mathbf{201}_1$...$\mathbf{201}_n$ has two main inputs, and two auxiliary inputs. The operation may be described with reference to FIG. 10.

The purpose of the ESE is to produce a standard pulse out when the two main inputs are sequentially activated. If we call the two main inputs $i$ and $j$, then one output gives a pulse when $j$ occurs, following $i$, and the other gives a pulse out when $i$ occurs, following $j$. We may designate these pulses $_{ij}e_n$ and $_{ji}e_n$. They are standard pulses, of duration $t$ microseconds. It the two main inputs overlap, or if the input labeled S/B, for Sequence Breaker, is activated between the occurrence of one main input and the other, then no output occurs; device is, instead, reset appropriately. The occurrence of either main input is "remembered," if either persists, by itself, after the other inputs have stopped. The device is symmetrical with respect to the two inputs and outputs, so the operation of half will now be detailed.

If a pulse appears at $i$, and no other input, then the bistable, comprised of gates 40 and 41, is set, and a "0" appears on the top input to gate 42. If a pulse then appears at $j$, and no other input, the output of gate 44 falls to zero, during the pulse, and a "1" pulse is therefore produced from gate 42, which momentarily has four simultaneous "0" inputs, presuming the other two inputs are at "0." This "1" pulse causes the monostable 202 to fire, and an output pulse is produced via drive circuit 203. The output signal also is fed back to clear the memory bistable, the additional connection to gate 39 ensuring that there is no ambiguity in the resetting operation due to $i$ becoming active again. The device is then ready to register another "Elementary Sequence."

Gate 43 produces a "1" output if both $i$ and $j$ are present at the same time. This prevents either output being activated by either input/bistable combination by inhibiting gate 42, and also resets the memory bistables—ambiguity being prevented by the cross connections from $i$ to gate 45 and $j$ to gate 39. Whichever input lasts longest will eventually be remembered, as is appropriate.

If a Sequence Breaker occurs, then, again, the memory bistables are positively reset, and the output is inhibited by the connections to gates 42 and 48. Thus a Sequence Breaker occurring in the middle of an Elementary Sequence does "break the sequence."

Figure 9:
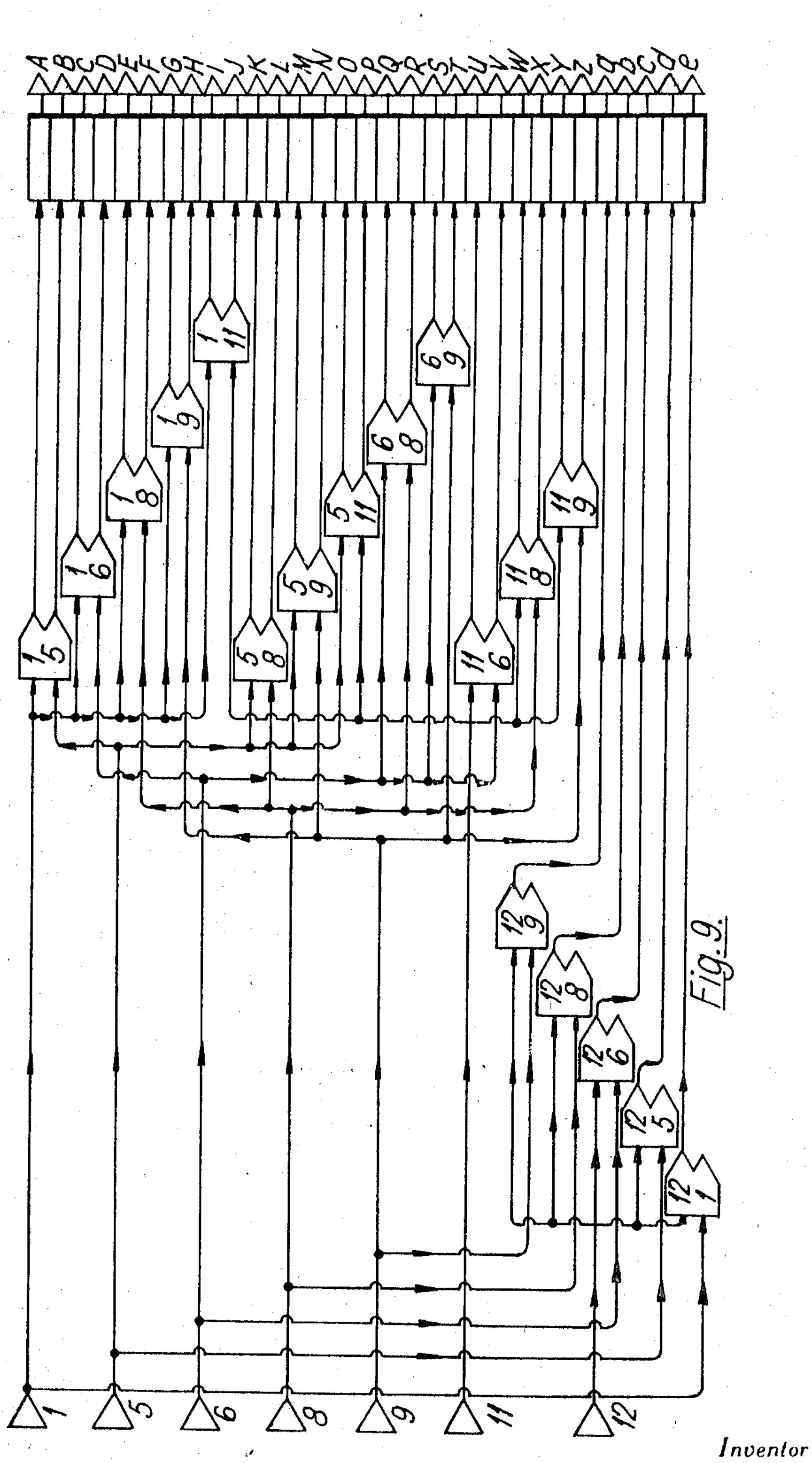
FIG. 9 is a schematic of the significant constituents of one form of sequence detector used in the arrangement of FIG. 1.

The input marked R/S, for Reset, is activated by the reset level generated by the controller, and simply clears the memory bistables ready for another operation. There is no problem of conflict with other signals, since the machine is frozen at the instant of resetting, though it could provide additional protection to insert a slight delay in the resetting of the control bistable, to make sure the machine is positively reset before it is "unfrozen." The final outputs of some if not all the ESE's are entered directly into the Bit Pattern Register 300, FIG. 9 also shown in FIG. 1.

Figure 11:
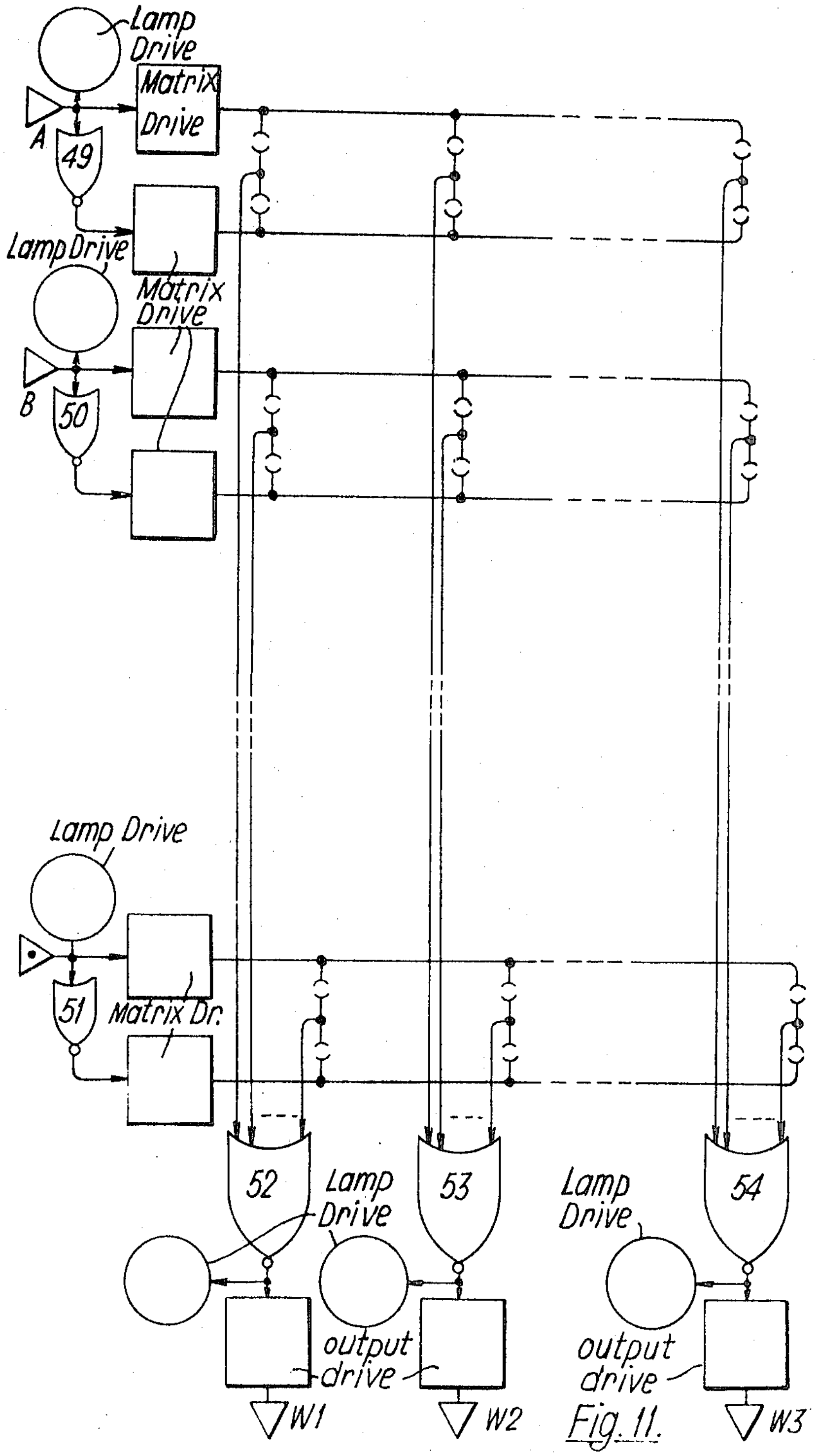
FIG. 11 is a schematic of the significant constituents of the decision logic used in the arrangement of FIG. 1.

The final section of the machine, the Decision taker 400, FIG. 1, is straightforward gating logic as shown in FIG. 11. The matrix may be, in practice, a three layer Sealectro plugboard. The strips in one layer of such a plugboard matrix may be shorted to the strips in either of the other two layers, which are arranged at right angles to the first layer. By putting in suitable plugs a pattern of input states may be selected for each desired output, so that the output only comes on when the specified inputs are in the specified states—combinations of "1" and "0." Lamps and drivers are provided to allow the operation to be monitored, and to allow the matrix rows and outputs to be driven.

The decision taker is thus a straight pattern matching arrangement.

It is to be understood that the foregoing description of specific examples of this invention is made by way of example only and is not to be considered as a limitation on its scope.

I claim:

1. Speech recognition apparatus comprising:

an acoustic analysis means coupled to provide, in response to an acoustic input, analogue signals on a plurality of channels, said means including frequency and energy level circuits;

means for transforming said analogue signals into binary signals and into a series of time-ordered markers;

means for marking the occurrence of sequential events representing sequential properties of the binary signals; and means for storing the occurrences of binary signals and markers as a bit pattern representing both the content and order information relating to the input.

2. Apparatus according to claim 1 in which the acoustic analysis means includes a plurality of filters each arranged to pass a different range of frequencies and means for producing from the filters a plurality of outputs each indicating the relative amplitudes of one of the filter outputs with respect to one another filter output.

3. Apparatus according to claim 2 including means for detecting the total energy in the input and means for producing from the total energy detector an output indicating that the total energy exceeds a predetermined threshold level.

4. Apparatus according to claim 3 in which the means for producing the outputs indicative of the relative amplitudes of the filter outputs each include trigger means having a first threshold level whereby the output is not inhibited when the ratio of one filter output amplitude to another filter output amplitude exceeds the first threshold and a second lower threshold level whereby the output is inhibited when the ratio falls below the second threshold level.

5. Apparatus according to claim 4 including means for producing an output when there is a balance between two filter outputs.

6. Apparatus according to claim 5 including means for inhibiting the balance output when the total energy does not exceed the predetermined threshold level.

7. Apparatus according to claim 4 including a plurality of pulse generators to each of which is applied one of the outputs derived from the filters and the total energy detector, each pulse generator being arranged to produce an output pulse the start of which occurs only when the input to the pulse generator has been present continuously for a predetermined period of time and the end of which occurs only when the input has been absent continuously for a predetermined period of time.

8. Apparatus according to claim 7 wherein each pulse generator includes a pair of one-shot multivibrators each of which delivers an output pulse which lasts for a predetermined period of time after an input has been applied, means for triggering one of the multivibrators from the leading edge of an input signal received from a filter or total energy detector, means for triggering the other multivibrator from the trailing edge of the input signal, and gating means for gating the input signal with the pulses generated by the two multivibrators whereby the gated input signal forms the output of the pulse generator means.

9. Apparatus according to claim 8 including means for normalizing the delays occurring in the outputs of a plurality of pulse generating means.

10. Apparatus according to claim 8 including a plurality of means for generating binary information signals each producing an output according to the significance and duration of the output of one of the pulse generating means.

11. Apparatus according to claim 10 including a plurality of gating logic means each of which is responsive to two or more binary input signals whereby the relative sequential occurrence of those signals can be determined and means for generating a binary output signal according to the relative sequential occurrence of the binary information signals.

12. Apparatus according to claim 1 wherein the binary input signals for some of the gating logic means are those derived from the pulse generating means and the binary output signals of some of the gating logic means form the binary input signals to other gating logic means.

13. Apparatus according to claim 11 including means for storing as a nonordered pattern the binary output signals from some of the gating logic means, means for comparing the stored information patterns with predetermined binary information patterns.

14. Apparatus according to claim 13 wherein the means for storing the binary output signals includes one or more monostables.

15. Apparatus according to claim 13 including means for determining the likelihood ratio of occurrence to nonoccurrence of the constituents of the nonordered pattern in comparison with a predetermined pattern and means responsive to said ratio whereby a decision is made for accepting, rejecting or requesting a repeat of the acoustic input.

16. Apparatus according to claim 10 including means for freezing the operation of or output from each of the plurality of means for generating binary information signals indicating the significance and duration of outputs of the pulse generating means.

17. An automatic speech recognition apparatus in which characteristics of a coupled input waveform may be analyzed and presented in the form of binary information to determine whether a known speech word is present in the waveform to recognize that word, the apparatus comprising:

means for analyzing said input waveform and providing on parallel channels analogue signals responsive to frequency and energy levels in said input waveform;

means for transforming said analogue signals into binary signals and then into a series of time-ordered markers;

means for marking the occurrence of sequential events which represent essential sequential properties of the binary signals; and means to store the binary signals and the markers as a bit pattern which represents both the content and order information concerning the input waveform.

18. The apparatus of claim 17 further comprising:

means for determining the likelihood ratio of occurrence to nonoccurrence of the constituents of the stored pattern in comparison with a predetermined pattern; and means responsive to said ratio whereby a decision is made to recognize said word.

* * * * *